(12) United States Patent
Eisenberg et al.

(10) Patent No.: US 11,784,321 B2
(45) Date of Patent: Oct. 10, 2023

(54) ELECTROCATALYSTS WITH BRANCHED-TYPE POROSITY

(71) Applicant: TECHNION RESEARCH & DEVELOPMENT FOUNDATION LIMITED, Haifa (IL)

(72) Inventors: David Eisenberg, Migdal HaEmeq (IL); Eliyahu Farber, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 264 days.

(21) Appl. No.: 17/261,068

(22) PCT Filed: Jul. 18, 2019

(86) PCT No.: PCT/IL2019/050812
§ 371 (c)(1),
(2) Date: Jan. 18, 2021

(87) PCT Pub. No.: WO2020/016899
PCT Pub. Date: Jan. 23, 2020

(65) Prior Publication Data
US 2021/0296657 A1    Sep. 23, 2021

Related U.S. Application Data

(60) Provisional application No. 62/699,787, filed on Jul. 18, 2018.

(51) Int. Cl.
*H01M 4/96* (2006.01)
*H01M 4/88* (2006.01)
*H01M 4/86* (2006.01)

(52) U.S. Cl.
CPC ......... *H01M 4/96* (2013.01); *H01M 4/8814* (2013.01); *H01M 4/8885* (2013.01); *H01M 2004/8689* (2013.01)

(58) Field of Classification Search
None
See application file for complete search history.

(56) References Cited

U.S. PATENT DOCUMENTS 6,325,909 B1   12/2001  Li et al.
8,354,052 B1 *  1/2013  Guenthner ........... D01D 5/0061
                                                              264/49

(Continued)

FOREIGN PATENT DOCUMENTS

CN    107093736 A    8/2017

OTHER PUBLICATIONS

Gao, X., Li, X., & Yu, W (2005) Flowerlike ZnO nanostructures via hexamethylenetetramine-assisted thermolysis of zinc-ethylenediamine complex. The Journal of Physical Chemistry B, 109(3), 1155-1161.

(Continued)

*Primary Examiner* — Lucas J. O'Donnell
(74) *Attorney, Agent, or Firm* — The Roy Gross Law Firm, LLC; Roy Gross

(57) ABSTRACT

A composition comprising a carbon material comprising a first channel with a width in the range of 50 nm to 1000 nm and a second channel with a width in the range of 20 nm to 200 nm, wherein the second channel comprises branches and is in fluid communication with the first channel, is provided. Further, articles comprising the composition are provided. A method for making a templated carbon material with hierarchical porosity is also provided.

15 Claims, 9 Drawing Sheets

(56) References Cited

U.S. PATENT DOCUMENTS

| | | | |
|---|---|---|---|
| 2010/0021794 A1 | 1/2010 | Kim et al. | |
| 2012/0219735 A1* | 8/2012 | Bakker | C23C 18/1648 |
| | | | 423/592.1 |
| 2014/0199546 A1 | 7/2014 | Sun et al. | |
| 2014/0291587 A1 | 10/2014 | Li et al. | |

OTHER PUBLICATIONS

Guo, Z., Zhou, D., Dong, X., Qiu, Z., Wang, Y., & Xia, Y. (2013). Ordered hierarchical mesoporous/macroporous carbon: a high-performance catalyst for rechargeable Li—O2 batteries. Advanced materials, 25(39), 5668-5672.

Jung MH. Carbon-coated ZnO mat passivation by atomic-layer-deposited HfO2 as an anode material for lithium-ion batteries. J Colloid Interface Sci. Nov. 1, 2017;505:631-641. doi: 10.1016/j.jcis.2017.06.069. Epub Jun. 20, 2017. PMID: 28651203.

Liu, G.-W., Chen, T.-Y., Chung, C.-H., Lin, H.-P., & Hsu, C.-H. (2017). Hierarchical Micro/Mesoporous Carbons Synthesized with a ZnO Template and Petroleum Pitch via a Solvent-Free Process for a High-Performance Supercapacitor. ACS Omega, 2(5), 2106-2113. doi:10.1021/acsomega.7b00308.

Pal, P., Pahari, S. K., Giri, A. K., Pal, S., Bajaj, H. C., & Panda, A. B. (2013). Hierarchically order porous lotus shaped nano-structured MnO2 through MnCO3: chelate mediated growth and shape dependent improved catalytic activity. Journal of Materials Chemistry A, 1(35), 10251. doi:10.1039/c3ta11440f.

Zhang, Z., Bao, J., He, C., Chen, Y., Wei, J., & Zhou, Z. (2014). Hierarchical Carbon-Nitrogen Architectures with Both Mesopores and Macrochannels as Excellent Cathodes for Rechargeable Li—O2Batteries. Advanced Functional Materials, 24(43), 6826-6833. doi:10.1002/adfm.201401581.

Gröger, O.; Gasteiger, H. A.; Suchsland, J.-P. Review—Electromobility: Batteries or Fuel Cells? J Electrochem. Soc. 2015, 162 (14), A2605-A2622.

Debe, M. K. Electrocatalyst Approaches and Challenges for Automotive Fuel Cells. Nature 2012, 486 (7401), 43-51.

Wang S, Teng Z, Wang C, Wang G. Stable and Efficient Nitrogen-Containing Carbon-Based Electrocatalysts for Reactions in Energy-Conversion Systems. ChemSusChem. Jul. 20, 2018;11(14):2267-2295. doi: 10.1002/cssc.201800509. Epub Jun. 26, 2018. PMID: 29770593.

Eisenberg, D.; Prinsen, P.; Geels, N. J.; Stroek, W.; Yan, N.; Hua, B.; Luo, J.-L.; Rothenberg, G. The Evolution of Hierarchical Porosity in Self-Templated Nitrogen-Doped Carbons and Its Effect on Oxygen Reduction Electrocatalysis. RSC Adv. 2016, 6 (84), 80398-80407.

Ratso, S., Kruusenberg, I., Käärik, M., Kook, M., Puust, L., Saar, R., Tammeveski, K. (2018). Highly efficient transition metal and nitrogen co-doped carbide-derived carbon electrocatalysts for anion exchange membrane fuel cells. Journal of Power Sources, 375, 233-243.

Ferrero GA, Preuss K, Marinovic A, Jorge AB, Mansor N, Brett DJ, Fuertes AB, Sevilla M, Titirici MM. Fe—N-Doped Carbon Capsules with Outstanding Electrochemical Performance and Stability for the Oxygen Reduction Reaction in Both Acid and Alkaline Conditions ACS Nano. Jun. 28, 2016;10(6):5922-32. doi: 10.1021/acsnano.6b01247. Epub May 23, 2016. PMID: 27214056.

Li, JC., Yang, ZQ., Tang, DM et al. N-doped carbon nanotubes containing a high concentration of single iron atoms for efficient oxygen reduction. NPG Asia Mater 10, e461 (2018). https://doi.org/10.1038/am.2017.212.

Barakat, N.A.M., El-Deen, A.G., Ghouri, Z.K. et al. Stable N-doped & FeNi-decorated graphene non-precious electrocatalyst for Oxygen Reduction Reaction in Acid Medium. Sci Rep 8, 3757 (2018). https://doi.org/10.1038/s41598-018-22114-1.

Bejan, A. (2015). Constructal Law: Optimization as Design Evolution. Journal of Heat Transfer, 137(6), 061003. doi:10.1115/1.4029850.

Stamenkovic VR, Strmcnik D, Lopes PP, Markovic NM. Energy and fuels from electrochemical interfaces. Nat Mater. Dec. 20, 2016;16(1):57-69 doi: 10.1038/nmat4738. PMID: 27994237.

Elmer, Theo & Riffat, Saffa. (2012). State of the Art Review: Fuel Cell Technologies in the Domestic Built Environment. 10.1007/978-3-319-07977-6_17.

Hannan, M.A. & Azidin, F.A. & Mohamed, A., 2014. "Hybrid electric vehicles and their challenges: A review," Renewable and Sustainable Energy Reviews, Elsevier, vol. 29(C), pp. 135-150.

Engineering ToolBox, (2008). Fossil and Alternative Fuels Energy Content. [online] Available at: https://www.engineeringtoolbox.com/fossil-fuels-energy-content-d_1298.html [Accessed Oct. 27, 2018].

Wang, Junye & Wang, Hualin & Fan, Yi. (2018). Techno-Economic Challenges of Fuel Cell Commercialization. Engineering. 4. 352-360. 10.1016/j.eng.2018.05.007.

He DS, He D, Wang J, Lin Y, Yin P, Hong X, Wu Y, Li Y. Ultrathin Icosahedral Pt-Enriched Nanocage with Excellent Oxygen Reduction Reaction Activity. J Am Chem Soc. Feb. 10, 2016; 138(5):1494-7. doi: 10.1021/jacs.5b12530. Epub Feb. 1, 2016. PMID: 26808073.

Inaba, M., Ando, M., Hatanaka, A., Nomoto, A., Matsuzawa, K., Tasaka, A., . . . Ogumi, Z. (2006). Controlled growth and shape formation of platinum nanoparticles and their electrochemical properties. Electrochimica Acta, 52(4), 1632-1638. doi: 10.1016/j.electacta.2006.03.094.

Sui, S.; Wang, X.; Zhou, X.; Su, Y.; Riffat, S.; Liu, C. A Comprehensive Review of Pt Electrocatalysts for the Oxygen Reduction Reaction: Nanostructure, Activity, Mechanism and Carbon Support in PEM Fuel Cells. J. Mater. Chem. A 2017, 5 (5), 1808-1825.

Patel, P., Velikokhatnyi, O., Ghadge, S., Jampani, P.H., Datta, M., Hong, D., Poston, J., Manivannan, A., & Kumta, P. (2017). Highly active robust oxide solid solution electro-catalysts for oxygen reduction reaction for proton exchange membrane fuel cell and direct methanol fuel cell cathodes. International Journal of Hydrogen Energy, 42, 24079-24089.

Rozenfeld, Shmuel & Schechter, Michal & Teller, Hanan & Cahan, Rivka & Schechter, Alex. (2017). Novel RuCoSe as non-platinum catalysts for oxygen reduction reaction in microbial fuel cells. Journal of Power Sources. 362. 140-146. 10.1016/j.jpowsour.2017.07.022.

Tan, X.; Zhang, J.; Wu, X.; Wang, Y.; Li, M.; Shi, Z. Palladium Nanoparticles Loaded on Nitrogen and Boron Dual-Doped Single-Wall Carbon Nanohorns with High Electrocatalytic Activity in the Oxygen Reduction Reaction. RSC Adv. 2018, 8 (59), 33688-33694.

Martinez, Ulises, Babu, Siddharth Komini, Holby, Edward F., and Zelenay, Piotr. Durability challenges and perspective in the development of PGM-free electrocatalysts for the oxygen reduction reaction. United States: N. p., 2018. Web. https://doi.org/10.1016/j.coelec.2018.04.010.

Han, J., Zhang, Y., Niu, F., Chen, T., Liu, J., & Xu, Y. (2018). Low-Cost and Highly Efficient Metal-Free Electrocatalysts for Oxygen Reduction Reaction: Environment-Friendly Three-Dimensional B, N Co-doped Graphene Aerogels. Electrocatalysis, doi: 10.1007/s12678-018-0494-y.

Ma, J., Yu, Y., Chen, C., Xiao, D., Li, K., Ma, J., . . . Zuo, X. (2018). Using Multifunctional Polymeric Soft Template for Synthesizing Nitrogen and Phosphorus Co-Doped Mesoporous Carbon Frameworks Electrocatalysts for Oxygen Reduction Reaction. ChemistrySelect, 3(31), 9013-9020. doi:10.1002/slct.201801177.

Yang, Chao & Jin, Huile & Cui, Cuixia & Li, Jielan & Wang, Jichang & Amine, Khalil & Lu, Jun & Wang, Shun. (2018). Nitrogen and sulfur co-doped porous carbon sheets for energy storage and pH-universal oxygen reduction reaction. Nano Energy. 54. 10.1016/j.nanoen.2018.10.005.

Kim, H., Lee, K., Woo, S. I., & Jung, Y. (2011). On the mechanism of enhanced oxygen reduction reaction in nitrogen-doped graphene nanoribbons. Physical Chemistry Chemical Physics, 13(39), 17505-17510 doi:10.1039/c1cp21665a.

Maddi, C., Bourquard, F., Barnier, V. et al. Nano-Architecture of nitrogen-doped graphene films synthesized from a solid CN source. Sci Rep 8, 3247 (2018). https://doi.org/10.1038/s41598-018-21639-9.

(56) References Cited

OTHER PUBLICATIONS

Wood, K. N.; O'Hayre, R.; Pylypenko, S. Recent Progress on Nitrogen/Carbon Structures Designed for Use in Energy and Sustainability Applications. Energy Environ Sci. 2014, 7 (4), 1212-1249.

Shui, Jianglan & Wang, Min & Du, Feng & Dai, Liming. (2015). N-doped carbon nanomaterials are durable catalysts for oxygen reduction reaction in acidic fuel cells. Science Advances. 1. e1400129-e1400129. 10.1126/sciadv.1400129.

Wang, D.-W.; Su, D. Heterogeneous Nanocarbon Materials for Oxygen Reduction Reaction. Energy Environ. Sci. 2014,7(2), 576-591.

Klingele, M., Van Pham, C., Fischer, A., & Thiele, S. (2016). A Review on Metal-Free Doped Carbon Materials Used as Oxygen Reduction Catalysts in Solid Electrolyte Proton Exchange Fuel Cells. Fuel Cells, 16(5), 522-529. doi:10.1002/fuce.201600113.

Schwieger, W.; Machoke, A. G.; Weissenberger, T.; Inayat, A.; Selvam, T.; Klumpp, M.; Inayat, A. Hierarchy Concepts: Classification and Preparation Strategies for Zeolite Containing Materials with Hierarchical Porosity. Chem. Soc. Rev. 2016, 45 (12), 3353-3376.

Tang, Z., Pei, Z., Wang, Z., Li, H., Zeng, J., Ruan, Z., Huang, Y., Zhu, M., Xue, Q., Yu, J., & Zhi, C. (2018). Highly anisotropic, multichannel wood carbon with optimized heteroatom doping for supercapacitor and oxygen reduction reaction. Carbon, 130, 532-543. https://doi.org/10.1016/j.carbon.2018.01.055.

Tang, C., Wang, W., Sun, A., Qi, C., Zhang, D., Wu, Z., & Wang, D. (2015). Sulfur-Decorated Molybdenum Carbide Catalysts for Enhanced Hydrogen Evolution. ACS Catalysis, 5(11), 6956-6963. doi:10.1021/acscatal.5b01803.

He, K.; Xu, C.-Y.; Zhen, L.; Shao, W.-Z. Fractal Growth of Single-Crystal $\alpha$-Fe2O3: From Dendritic Micro-Pines to Hexagonal Micro-Snowflakes. Mater. Lett. 2008, 62 (4), 739-742. (35).

Cao M, Liu T, Gao S, Sun G, Wu X, Hu C, Wang ZL. Single-crystal dendritic micro-pines of magnetic alpha-Fe2O3: large-scale synthesis, formation mechanism, and properties. Angew Chem Int Ed Engl. Jul. 4, 2005;44(27):4197-201. doi: 10.1002/anie.200500448. PMID: 15940730.

Fang, X., Peng, L., Shang, X., & Zhang, Z. (2011). Controlled synthesis of ZnO branched nanorod arrays by hierarchical solution growth and application in dye-sensitized solar cells. Thin Solid Films, 519(19), 6307-6312. doi:10.1016/j.tsf.2011.04.008.

Baeten, L.; Conings, B.; D'Haen, J.; De Dobbelaere, C.; Hardy, A.; Manca, J. V.; Van Bael, M. K. Tuning the Dimensions of ZnO Nanorod Arrays for Application in Hybrid Photovoltaics. ChemPhysChem 2012, 13 (11), 2777-2783.

Zhao, F., Zheng, J.-G., Yang, X., Li, X., Wang, J., Zhao, F., Wu, M. (2010). Complex ZnO nanotree arrays with tunable top, stem and branch structures. Nanoscale, 2(9), 1674. doi:10.1039/c0nr00076k.

You, C., Zheng, R., Shu, T., Liu, L., & Liao, S. (2016). High porosity and surface area self-doped carbon derived from polyacrylonitrile as efficient electrocatalyst towards oxygen reduction. Journal of Power Sources, 324, 134-141. doi:10.1016/j.jpowsour.2016.05.077.

Kharisov, B. I., Kharissova, O. V., García, B. O., Méndez, Y. P., & de la Fuente, I. G. (2015). State of the art of nanoforest structures and their applications RSC Advances, 5(128), 105507-105523. doi:10.1039/c5ra22738k.

PCT International Search Report for International Application No. PCT/IL2019/050812, dated Nov. 21, 2021, 6pp.

PCT Written Opinion for International Application No. PCT/IL2019/050812, dated Nov. 21, 2021, 5pp.

* cited by examiner

1 Non templated. Micropores only.

2 Templated for macro pores.

3 Templated for macro and meso pores ('hierarchical').

4 Templated for hierarchical and continuous porosity.

5 Templated for directional hierarchical porosity.

6 Lung type carbon: Templated for directional, continuous, hierarchical porosity.

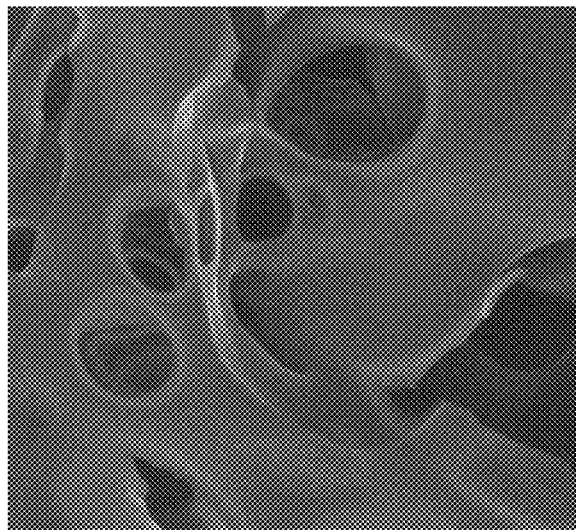 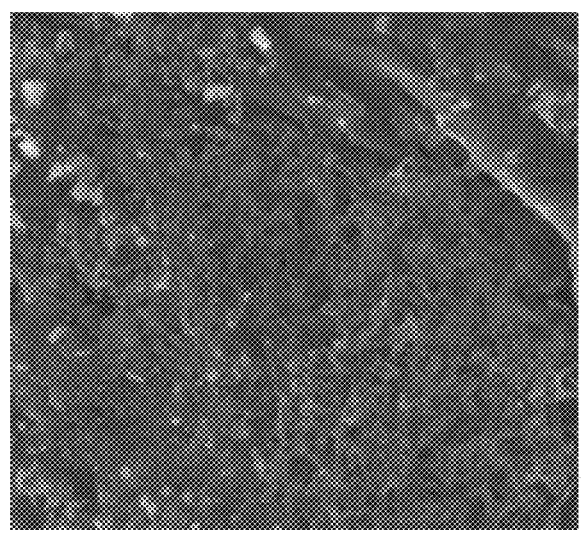
Figure 7A
Figure 7B
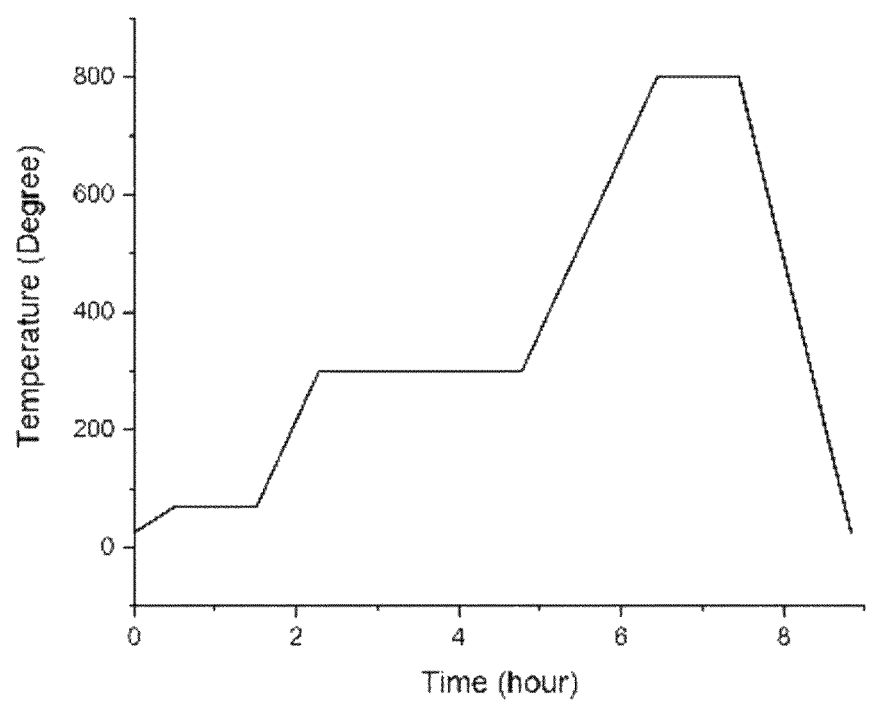
Figure 8

| # | Description | ZnO template | Templated PAN derived carbon |
|---|---|---|---|
| 1 | Non templated | | |
| 2 | Templated for macro pores | | |
| 3 | Templated for macro and meso pores | | |
| 4 | Templated for hierarchical and continuous porosity | | |
| 5 | Templated for directional hierarchical porosity | | |
| 6 | Lung type carbon: Templated for directional, continuous hierarchical porosity | | |

Figure 10

ELECTROCATALYSTS WITH BRANCHED-TYPE POROSITY

CROSS REFERENCE TO RELATED APPLICATIONS

This application is a National Phase of PCT Patent Application No. PCT/IL2019/050812 having International filing date of Jul. 18, 2019, which claims the benefit of priority to U.S. Provisional Patent Application No. 62/699,787 filed Jul. 18, 2018 entitled "LUNG-TYPE CATALYSTS", the contents of which are incorporated herein by reference in their entirety.

FIELD OF THE INVENTION

The present invention is in the field of material science and electrocatalysis.

BACKGROUND OF THE INVENTION

The use of fuel cells for transportation may enable a revolution of clean energy and is an important step in lowering and eliminating the use of fossil fuels. An important obstacle in the widespread adoption of fuel cells is their high cost, due to their use of precious metals—primarily platinum—to catalyze the electrochemical reactions driving the electric current generated.

Fuel cell technologies may have the additional advantage of high efficiency. While much has been done to develop fuel cell technology and emphasis has been placed on the environmental benefits of its use, less emphasis has been placed on materials sources and hardware materials recovery.

A fuel cell may deliver high efficiency even while operating under partial design loads. To this end, its high efficiency is scalable from very small units to very large units. A combustion engine, however, is most efficient under full operational loads and only at certain minimum engine sizes.

There is a need for new materials that have the ability to compete with the known precious metals in the reduction of oxygen as a practical alternative to the expensive metals.

SUMMARY OF THE INVENTION

According to one aspect, there is provided a composition comprising a carbon material comprising a first channel with a width in the range of 50 nm to 1000 nm and a second channel with a width in the range of 20 nm to 200 nm, wherein the second channel comprises branches and is in fluid communication with the first channel.

In some embodiments, the composition comprises micropores in the range of 0.5 nm to 5 nm.

In some embodiments, the ratio of the second channel to the branches is in the range of 1:10 to 1:200.

In some embodiments, the angle between the first channel and the second channel is in the range of 60° to 120°.

In some embodiments, the composition comprises 1 to 50 first channel per $\mu m^2$ of the carbon material.

In some embodiments, the composition comprises a branch density of 100 to 1000 branches per $\mu m^3$ of the carbon material.

In some embodiments, the carbon material has a thickness in the range of 0.1 µm to 50 µm.

In some embodiments, the carbon material comprises a surface area of 300 $m^2$/gr to 2000 $m^2$/gr.

In some embodiments, the carbon material is nitrogen-doped.

In some embodiments, the nitrogen is present in pyridinic form, pyrrolic form, pyrimidonic form, graphitic form, metal-bound form, oxidized form, or any combination thereof.

In some embodiments, the composition comprises 1 at % to 20 at % of nitrogen.

In some embodiments, the first channel and the second channel are void.

In some embodiments, the first channel and the second channel comprise a metal, metal oxide, or combinations thereof.

In some embodiments, the metals are selected from the group consisting of Zn, Li, Mg, Al, K, Ca, Mn, Fe, Cu, Pd, Pt, Au, Pb, Ni, Co, Cr, W, Mo, V.

In some embodiments, the composition further comprises a substrate.

In some embodiments, the substrate comprises polymeric substrate, metallic substrate, ceramic substrate, glass substrate, a semiconductor substrate, or any combination thereof.

In some embodiments, the composition is a catalyst.

In some embodiments, the composition is for use in oxygen reduction reaction (ORR).

According to one aspect, there is provided an article comprising the composition of the present invention.

In some embodiments, the composition is deposited on at least one surface of the article.

In some embodiments, the article is in the form of a cathode.

According to one aspect, there is provided an electrochemical cell comprising the article of the present invention.

According to one aspect, there is provided a process for oxygen reduction, the process comprising: (i) contacting the electrochemical cell of the present invention with oxygen, and (ii) applying an electric potential to the electrochemical cell, thereby reducing the oxygen.

According to one aspect, there is provided a method for making a templated carbon material with hierarchical porosity, comprising: a. providing a template generated by growth of a metal, metal oxide, or combination thereof, in the presence of a chelating agent; b. coating the template with a polymeric carbon precursor, thereby obtaining a coated template; and c. pyrolyzing the coated template.

In some embodiments, the method further comprises step (d) of washing out the template.

In some embodiments, the polymeric carbon precursor comprises nitrogen.

In some embodiments, the chelating agent comprises ethylenediamine, propylene diamine, diethylene triamine, triethylene tetramine, ethylenediaminetetraacetic acid, iminodiacetic acid, citric acid, hydroxyquinoline, hydroxyquinone, carbozxylate, or any combination thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 7A-B present MFR foamy carbon (FIG. 7A), and templated MFR carbon (FIG. 7B);

FIG. 8 presents a graph of an exemplary heat profile for PAN pyrolysis;

FIG. 10 presents a scheme of various controls, SEM images of the templates and prepared carbons.

DETAILED DESCRIPTION OF THE INVENTION

Figure 1:
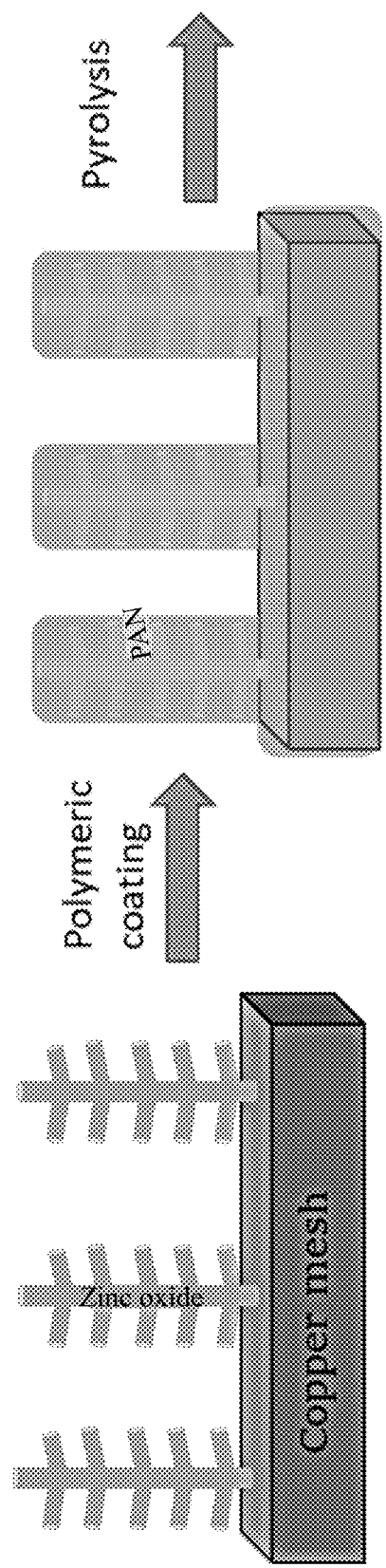
FIG. 1 presents a synthetic scheme of lung-type carbon by the hard template method.
Figure 1:
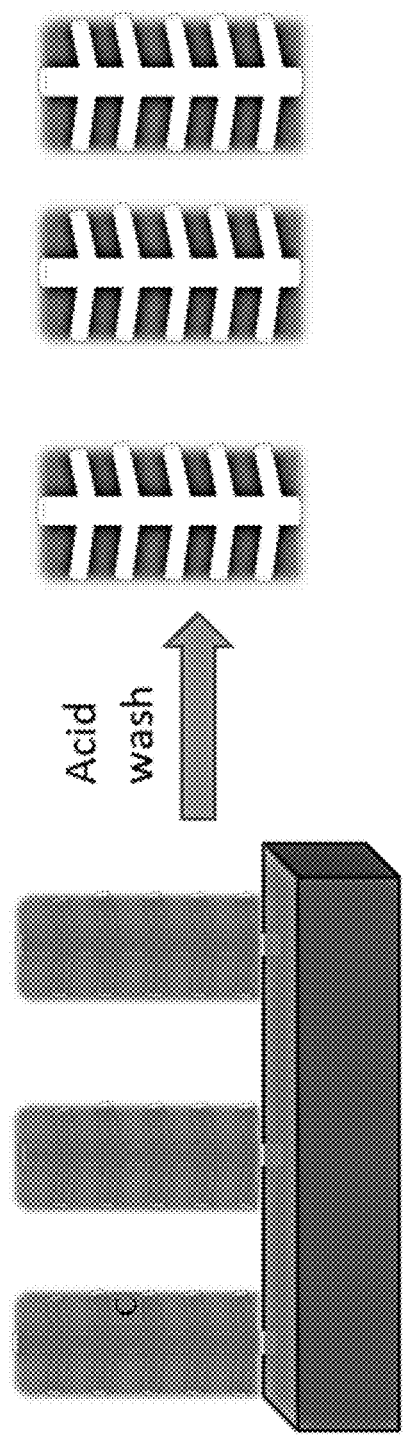

According to some embodiments, the present invention provides a hierarchically porous carbon material. According to some embodiments, the present invention provides a composition comprising a porous carbon material comprising directional and interconnected channels. In some embodiments, the composition is for use in electrocatalysis. In some embodiments, the directional and interconnected channels enable an easier access of reactants to active sites of the porous carbon composition, providing an improved catalytic activity to the composition. In one embodiment, a first channel is interconnected or connected to at least one second channel. In one embodiment, a first channel as described herein is branched to second channel at one end or both ends of the first channel.

The Composition

According to some embodiments, the present invention provides a composition comprising a carbon material comprising a first channel with a width in the range of 50 nm to 1000 nm and a second channel with a width in the range of 20 nm to 200 nm. In some embodiments, the second channel comprises branches. In some embodiments, the second channel is in fluid communication with the first channel.

As used herein, the terms "hierarchically porous" and "hierarchical porosity" refer to the presence of at least two different pore sizes in the carbon material, i.e., at least one set of pores being mesoporous and at least one set of pores being macroporous. The mesopores and macropores may be arranged, with respect to each other, in any of several different ways. In other embodiments, at least one (or both) of the mesopores and macropores are arranged in an ordered (i.e., patterned) manner. In some embodiments, the carbon material comprises pores organized in a lung-like arrangement. In some embodiments, the carbon material comprises mesopores and macropores intermingled in an ordered manner. In some embodiments, the carbon material comprises mesopores and macropores intermingled in a disordered manner.

As used herein, the term "channel" refers to a hollow pathway or conduit defined by surrounding walls, where a liquid or gas can flow. In some embodiments, the first channel and the second channel are defined and surrounded by the porous carbon material.

As used herein, the term "branches" refers to a point to point path or channel or a point-to-multipoint path or channel or a split of one channel to at least two channels. In some embodiments, branches include a single branch. In some embodiments, branches include a plurality of branches.

As used herein, the term "carbon material" refers to carbon containing structures. Example of carbon materials comprise activated carbon, mesoporous carbon, templated carbon, carbide-derived carbon, porous carbon sphere, and carbon onion. In some embodiments, carbon materials according to the present invention comprise activated carbons, i.e. materials prepared by pyrolysis. In some embodiments, carbon materials according to the present invention are prepared by pyrolysis of carbon precursors. In some embodiments, carbon precursors comprise one or more polymers, small organic molecules or small molecular weight saccharides. In some embodiments, compositions according to the present invention comprise porous carbon materials. Porous carbon materials can be classified according to their pore diameters: microporous (<2 nm), mesoporous (2-50 nm), and macroporous (>50 nm). The structure of the porous carbon material can take various forms depending on the starting material, and the manufacturing method.

In some embodiments, the composition comprises a first channel resembling a tree trunk and a second channel comprising branches resembling tree branches. In one embodiment, a first channel feeds or is fluidly connected to a second channel.

In some embodiments, the first channel has a width in the range of 60 nm to 1000 nm, 80 nm to 1000 nm, 100 nm to 1000 nm, 120 nm to 1000 nm, 150 nm to 1000 nm, 200 nm to 1000 nm, 60 nm to 900 nm, 80 nm to 900 nm, 100 nm to 900 nm, 120 nm to 900 nm, 150 nm to 900 nm, 200 nm to 900 nm, 60 nm to 700 nm, 80 nm to 700 nm, 100 nm to 700 nm, 120 nm to 700 nm, 150 nm to 700 nm, 200 nm to 700 nm, 60 nm to 500 nm, 80 nm to 500 nm, 100 nm to 500 nm, 120 nm to 500 nm, 150 nm to 500 nm, or 200 nm to 500 nm, including any range therebetween.

In one embodiment, a "width" is a diameter. In one embodiment, a "width" is the largest width of a channel such as described herein. In some embodiments, the first channel's width is at least 2 times, 3 times, 4 times, 5 times, 6 times, 7 times, 8 times, 9 times, 10 times or 15 times, larger than the second channel's width.

In some embodiments, the first channel has a length in the range of 0.5 µm to 20 µm, 0.9 µm to 20 µm, 1 µm to 20 µm, 1.5 µm to 20 µm, 2.5 µm to 20 µm, 3 µm to 20 µm, 4 µm to 20 µm, 5 µm to 20 µm, 8 µm to 20 µm, 9 µm to 20 µm, 10 µm to 20 µm, 15 µm to 20 µm, 0.5 µm to 15 µm, 0.9 µm to 15 µm, 1 µm to 15 µm, 1.5 µm to 15 µm, 2.5 µm to 15 µm, 3 µm to 15 µm, 4 µm to 15 µm, 5 µm to 15 µm, 8 µm to 15 µm, 9 µm to 15 µm, 0.5 µm to 10 µm, 0.9 µm to 10 µm, 1

μm to 10 μm, 1.5 μm to 10 μm, 2.5 μm to 10 μm, 3 μm to 10 μm, 4 μm to 10 μm, 5 μm to 10 μm, 8 μm to 10 μm, 9 μm to 10 μm, 0.5 μm to 5 μm, 0.9 μm to 5 μm, 1 μm to 5 μm, 1.5 μm to 5 μm, 2.5 μm to 5 μm, 3 μm to 5 μm, or 4 μm to 5 μm, including any range therebetween.

In some embodiments, the second channel has a width in the range of 25 nm to 200 nm, 30 nm to 200 nm, 40 nm to 200 nm, 50 nm to 200 nm, 60 nm to 200 nm, 65 nm to 200 nm, 70 nm to 200 nm, 80 nm to 200 nm, 90 nm to 200 nm, 100 nm to 200 nm, 25 nm to 180 nm, 30 nm to 180 nm, 40 nm to 180 nm, 50 nm to 180 nm, 60 nm to 180 nm, 65 nm to 180 nm, 70 nm to 180 nm, 80 nm to 180 nm, 90 nm to 180 nm, 100 nm to 180 nm, 25 nm to 150 nm, 30 nm to 150 nm, 40 nm to 150 nm, 50 nm to 150 nm, 60 nm to 150 nm, 65 nm to 150 nm, 70 nm to 150 nm, 80 nm to 150 nm, 90 nm to 150 nm, or 100 nm to 150 nm, including any range therebetween.

In some embodiments, the second channel has a length in the range of 20 nm to 1 μm, 30 nm to 1 μm, 40 nm to 1 μm, 50 nm to 1 μm, 60 nm to 1 μm, 70 nm to 1 μm, 80 nm to 1 μm, 90 nm to 1 μm, 20 nm to 1 μm, 20 nm to 95 nm, 30 nm to 95 nm, 40 nm to 95 nm, 50 nm to 95 nm, 60 nm to 95 nm, 70 nm to 95 nm, 80 nm to 95 nm, 20 nm to 75 nm, 30 nm to 75 nm, 40 nm to 75 nm, 50 nm to 75 nm, 60 nm to 75 nm, 70 nm to 75 nm, 20 nm to 50 nm, 30 nm to 50 nm, or 40 nm to 50 nm, including any range therebetween.

In some embodiments, the composition comprises micropores with a size in the range of 0.5 nm to 5 nm, 0.6 nm to 5 nm, 0.7 nm to 5 nm, 0.8 nm to 5 nm, 0.9 nm to 5 nm, 1 nm to 5 nm, 1.5 nm to 5 nm, 1.9 nm to 5 nm, 2 nm to 5 nm, 2.5 nm to 5 nm, 3 nm to 5 nm, 3.5 nm to 5 nm, 0.5 nm to 4 nm, 0.6 nm to 4 nm, 0.7 nm to 4 nm, 0.8 nm to 4 nm, 0.9 nm to 4 nm, 1 nm to 4 nm, 1.5 nm to 4 nm, 1.9 nm to 4 nm, 2 nm to 4 nm, 2.5 nm to 4 nm, 3 nm to 4 nm, 3.5 nm to 4 nm, 0.5 nm to 3 nm, 0.6 nm to 3 nm, 0.7 nm to 3 nm, 0.8 nm to 3 nm, 0.9 nm to 3 nm, 1 nm to 3 nm, 1.5 nm to 3 nm, 1.9 nm to 3 nm, or 2 nm to 3 nm, including any range therebetween.

In some embodiments, the ratio of the first channel to the second channel is in the range of 1:10 to 1:200, 1:15 to 1:200, 1:20 to 1:200, 1:30 to 1:200, 1:40 to 1:200, 1:50 to 1:200, 1:10 to 1:180, 1:15 to 1:180, 1:20 to 1:180, 1:30 to 1:180, 1:40 to 1:180, 1:50 to 1:180, 1:10 to 1:150, 1:15 to 1:150, 1:20 to 1:150, 1:30 to 1:150, 1:40 to 1:150, 1:50 to 1:150, 1:10 to 1:100, 1:15 to 1:100, 1:20 to 1:100, 1:30 to 1:100, 1:40 to 1:100, or 1:50 to 1:100, including any range therebetween.

In some embodiments, the ratio of the second channel to the branches is in the range of 1:10 to 1:200, 1:15 to 1:200, 1:20 to 1:200, 1:30 to 1:200, 1:40 to 1:200, 1:50 to 1:200, 1:10 to 1:180, 1:15 to 1:180, 1:20 to 1:180, 1:30 to 1:180, 1:40 to 1:180, 1:50 to 1:180, 1:10 to 1:150, 1:15 to 1:150, 1:20 to 1:150, 1:30 to 1:150, 1:40 to 1:150, 1:50 to 1:150, 1:10 to 1:100, 1:15 to 1:100, 1:20 to 1:100, 1:30 to 1:100, 1:40 to 1:100, or 1:50 to 1:100, including any range therebetween.

In some embodiments, the angle between the first channel and the second channel is in the range of 60° to 120°, 65° to 120°, 70° to 120°, 75° to 120°, 80° to 120°, 90° to 120°, 95° to 120° 60° to 110° 65° to 110° 70° to 110° 75° to 110° 80° to 110° 90° to 110° 60° to 100°, 65° to 100°, 70° to 100°, 75° to 100°, 80° to 100°, 90° to 100°, 60° to 90°, 65° to 90°, 70° to 90°, 75° to 90°, or 80° to 90°, including any range therebetween.

In some embodiments, the angle between the second channel and the branches is in the range of 60° to 120°, 65° to 120°, 70° to 120°, 75° to 120°, 80° to 120°, 90° to 120°, 95° to 120° 60° to 110° 65° to 110° 70° to 110° 75° to 110° 80° to 110° 90° to 110° 60° to 100°, 65° to 100°, 70° to 100°, 75° to 100°, 80° to 100°, 90° to 100°, 60° to 90°, 65° to 90°, 70° to 90°, 75° to 90°, or 80° to 90°, including any range therebetween.

In some embodiments, the composition comprises 1 to 50 first channel per μm$^2$ of the carbon material. In some embodiments, the composition comprises 1 to 50, 2 to 50, 3 to 50, 4 to 50, 5 to 50, 10 to 50, 1 to 40, 2 to 40, 3 to 40, 4 to 40, 5 to 40, 10 to 40, 1 to 30, 2 to 30, 3 to 30, 4 to 30, 5 to 30, 10 to 30, 1 to 20, 2 to 20, 3 to 20, 4 to 20, 5 to 20, or 10 to 20, channel per μm$^2$ of the carbon material, including any range therebetween.

In some embodiments, the composition comprises a branch density of 100 to 1000 branches per μm$^3$ of the carbon material. In some embodiments, the composition comprises a branch density of 100 to 1000, 200 to 1000, 300 to 1000, 400 to 1000, 500 to 1000, 600 to 1000, 700 to 1000, 800 to 1000, 100 to 900, 200 to 900, 300 to 900, 400 to 900, 500 to 900, 600 to 900, 700 to 900, 800 to 900, 100 to 800, 200 to 800, 300 to 800, 400 to 800, 500 to 800, 600 to 800, or 700 to 800, branches per μm$^3$ of the carbon material, including any range therebetween.

In some embodiments, the carbon material has a thickness in the range of 0.1 μm to 50 μm, 0.2 μm to 50 μm, 0.3 μm to 50 μm, 0.4 μm to 50 μm, 0.5 μm to 50 μm, 0.9 μm to 50 μm, 1 μm to 50 μm, 5 μm to 50 μm, 10 μm to 50 μm, 0.1 μm to 40 μm, 0.2 μm to 40 μm, 0.3 μm to 40 μm, 0.4 μm to 40 μm, 0.5 μm to 40 μm, 0.9 μm to 40 μm, 1 μm to 40 μm, 5 μm to 40 μm, 10 μm to 40 μm, 0.1 μm to 30 μm, 0.2 μm to 30 μm, 0.3 μm to 30 μm, 0.4 μm to 30 μm, 0.5 μm to 30 μm, 0.9 μm to 30 μm, 1 μm to 30 μm, 5 μm to 30 μm, 10 μm to 30 μm, 0.1 μm to 20 μm, 0.2 μm to 20 μm, 0.3 μm to 20 μm, 0.4 μm to 20 μm, 0.5 μm to 20 μm, 0.9 μm to 20 μm, 1 μm to 20 μm, 5 μm to 20 μm, 10 μm to 20 μm, 0.1 μm to 10 μm, 0.2 μm to 10 μm, 0.3 μm to 10 μm, 0.4 μm to 10 μm, 0.5 μm to 10 μm, 0.9 μm to 10 μm, 1 μm to 10 μm, or 5 μm to 10 μm, including any range therebetween.

In some embodiments, the carbon material comprises a surface area of 300 m$^2$/gr to 2000 m$^2$/gr, 500 m$^2$/gr to 2000 m$^2$/gr, 700 m$^2$/gr to 2000 m$^2$/gr, 900 m$^2$/gr to 2000 m$^2$/gr, 1000 m$^2$/gr to 2000 m$^2$/gr, 1100 m$^2$/gr to 2000 m$^2$/gr, 1500 m$^2$/gr to 2000 m$^2$/gr, 1700 m$^2$/gr to 2000 m$^2$/gr, 300 m$^2$/gr to 1900 m$^2$/gr, 500 m$^2$/gr to 1900 m$^2$/gr, 700 m$^2$/gr to 1900 m$^2$/gr, 900 m$^2$/gr to 1900 m$^2$/gr, 1000 m$^2$/gr to 1900 m$^2$/gr, 1100 m$^2$/gr to 1900 m$^2$/gr, 1500 m$^2$/gr to 1900 m$^2$/gr, 1700 m$^2$/gr to 1900 m$^2$/gr, 300 m$^2$/gr to 1800 m$^2$/gr, 500 m$^2$/gr to 1800 m$^2$/gr, 700 m$^2$/gr to 1800 m$^2$/gr, 900 m$^2$/gr to 1800 m$^2$/gr, 1000 m$^2$/gr to 1800 m$^2$/gr, 1100 m$^2$/gr to 1800 m$^2$/gr, 1500 m$^2$/gr to 1800 m$^2$/gr, 170 m$^2$/gr to 1800 m$^2$/gr, 300 m$^2$/gr to 1500 m$^2$/gr, 500 m$^2$/gr to 1500 m$^2$/gr, 700 m$^2$/gr to 1500 m$^2$/gr, 900 m$^2$/gr to 1500 m$^2$/gr, 1000 m$^2$/gr to 1500 m$^2$/gr, or 1100 m$^2$/gr to 1500 m$^2$/gr, including any range therebetween.

In some embodiments, the carbon material is nitrogen doped. In some embodiments, the nitrogen is present in pyridinic form, pyrrolic form, pyrimidonic form, graphitic form metal-bound form, oxidized form, or any combination thereof. In some embodiments, the composition comprises 1 at % to 20 at %, 2 at % to 20 at %, 3 at % to 20 at %, 4 at % to 20 at %, 5 at % to 20 at %, 6 at % to 20 at %, 7 at % to 20 at %, 8 at % to 20 at %, 9 at % to 20 at %, 10 at % to 20 at %, 1 at % to 15 at %, 2 at % to 15 at %, 3 at % to 15 at %, 4 at % to 15 at %, 5 at % to 15 at %, 6 at % to 15 at %, 7 at % to 15 at %, 8 at % to 15 at %, 9 at % to 15 at %, 10 at % to 15 at %, 1 at % to 12 at %, 2 at % to 12 at %, 3 at % to 12 at %, 4 at % to 12 at %, 5 at % to 12 at %, 6 at % to 12 at %, 7 at % to 12 at %, 8 at % to 12 at %, 9 at % to 12 at %, 10 at % to 12 at %, 1 at % to 10 at %, 2 at % to 10 at %, 3 at % to 10 at %, 4 at % to 10 at %, 5 at % to 10 at %, 6 at % to 10 at %, 7 at % to 10 at %, 8 at % to 10 at %, or 9 at % to 10 at %, including any range therebetween.

In some embodiments, the first channel is void. In some embodiments, the second channel is void. In some embodiments, the first channel and the second channel are void.

In some embodiments, the first channel comprises a metal, metal oxide, or combinations thereof. In some embodiments, the second channel comprises a metal, metal oxide, or combinations thereof. In some embodiments, the first channel and the second channel comprise a metal, metal oxide, or combinations thereof.

One of skill in the art will appreciate that the order of the channels may be altered in various embodiments and that the nomenclature "first channel" and "second channel" is used herein for ease of reference.

In some embodiments, the metals are selected from the group consisting of Zn, Li, Mg, Al, K, Ca, Mn, Fe, Cu, Pd, Pt, Au, Pb, Ni, Co, Cr, W, Mo, and V.

In some embodiments, the composition further comprises a substrate. In some embodiments, the substrate comprises polymeric substrate, metallic substrate, ceramic substrate, glass substrate, a semiconductor substrate, or any combination thereof.

In some embodiments, the composition is a catalyst.

In some embodiments, the composition is for use in oxygen reduction reaction (ORR).

According to some embodiments, the present invention provides an article comprising a composition as described herein.

In some embodiments, the composition is deposited on at least one surface of the article. In some embodiments, the article is in the form of a cathode.

According to some embodiments, the present invention provides an electrochemical cell comprising an article described herein. In some embodiments, the electrochemical cell is configured to reduce oxygen at onset potentials in the range of 0.01 V vs. RHE to 1 V vs. RHE, 0.05 V vs. reversible hydrogen electrode (RHE) to 1 V vs. RHE, 0.1 V vs. RHE to 0.9 V vs. RHE, 0.01 V vs. RHE to 0.9 V vs. RHE, 0.01 V vs. RHE to 0.8 V vs. RHE, 0.01 V vs. RHE to 0.7 V vs. RHE, including any range therebetween.

According to some embodiments, the present invention provides a process for oxygen reduction, the process comprising: (i) contacting the electrochemical cell described herein with oxygen, and (ii) applying an electric potential to the electrochemical cell, thereby reducing the oxygen.

In some embodiments, contacting the electrochemical cell is with an oxygen containing solution. In some embodiments, the solution has a pH of 12 to 14.

The Method

According to some embodiments, the present invention provides a method for making a templated carbon material with hierarchical porosity.

In some embodiments, the method comprises: a. providing a template generated by growth of a metal, metal oxide, or combination thereof, in the presence of a chelating agent; b. coating the template with a carbon precursor, thereby obtaining a coated template; and c. pyrolyzing the coated template.

In some embodiments, step c, comprises heating at different temperatures.

In some embodiments, the coated template is heated at a first temperature of 40° C. to 90° C., 50° C. to 90° C., 60° C. to 90° C., 70° C. to 90° C., 40° C. to 80° C., 50° C. to 80° C., 60° C. to 80° C., 70° C. to 80° C., 40° C. to 80° C., 50° C. to 80° C., 60° C. to 80° C., or 70° C. to 80° C., including any range therebetween. In some embodiments, the coated template is heated at a first temperature at 10° C./min hold for 1 hour.

In some embodiments, the coated template is heated at a second temperature of 100° C. to 500° C., 150° C. to 500° C., 200° C. to 500° C., 250° C. to 500° C., 300° C. to 500° C., 350° C. to 500° C., 100° C. to 400° C., 150° C. to 400° C., 200° C. to 400° C., 250° C. to 400° C., 300° C. to 400° C., 350° C. to 400° C., 100° C. to 300° C., 150° C. to 300° C., 200° C. to 300° C., or 250° C. to 300° C., including any range therebetween. In some embodiments, the coated template is heated at a second temperature at 5° C./min hold for 3 hours.

In some embodiments, the coated template is heated at a third temperature of 600° C. to 900° C., 650° C. to 900° C., 700° C. to 900° C., 750° C. to 900° C., or 800° C. to 900° C., including any range therebetween. In some embodiments, the coated template is heated at a third temperature at 5° C./min hold for 1 hour.

In some embodiments, after heating at a first temperature, second temperature and third temperature, the coated template is cooled to room temperature.

In some embodiments, the method further comprises a step (d) of washing out the template.

In some embodiments, the template comprises two metal oxides. In some embodiments, a first metal oxide forms nano wires under heating conditions. In some embodiments, adding a second metal oxide under heating conditions leads to the growth of tree-like templates. In some embodiments, the template is a directional and hierarchical template.

In some embodiments, carbon precursors comprise one or more polymers, small organic molecules or small molecular weight saccharides. In some embodiments, the carbon precursor is a polymeric carbon precursor. In some embodiments, the polymeric carbon precursor turns into carbon during pyrolysis. In some embodiments, polymeric carbon precursor reacts with a metal oxide, reducing it to the corresponding metallic form. In some embodiments, after washing out the template, a carbon material with tree-like or lung-like 'airways' into the carbon is obtained.

In some embodiments, the polymeric carbon precursor retains its shape when pyrolyzed.

In some embodiments, the polymeric carbon precursor comprises nitrogen. In some embodiments, the carbon material comprises nitrogen atoms incorporated into the carbonaceous matrix.

In some embodiments, the chelating agent comprises ethylenediamine, propylene diamine, diethylene triamine, triethylene tetramine, ethylenediaminetetraacetic acid, iminodiacetic acid, citric acid, hydroxyquinoline, hydroxyquinone, carbozxylate, or any combination thereof. As used herein, the term "chelating agent" refers to synthetic or natural molecules that bound to metal ions.

General

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Material and Methods

Material Preparation

To induce lung-type porosity into an N-doped carbon, first a suitable template is needed. The template is then be coated with a nitrogen-containing polymer. The coated template is subsequently pyrolyzed, and the template washed out, leaving a porous structure behind (FIG. 1). Several aspects need to be taken into account regarding the template. The template's morphology needs to be the negative of the desired porous system. For directional pores, the template needs to be supported so that an open channel is left behind after removal. The template needs to be stable throughout the carbonization process, and be removable once the pyrolysis is done. Another important part to consider is the polymer, which needs to retain its shape as it is pyrolyzed. In addition, it must contain nitrogen atoms, which are incorporated into the carbon matrix. It must adhere and wet the template.

A system that qualified and fulfilled all of the above conditions is that of zinc oxide branched structures, supported from a copper grid, with crosslinked polyacrylonitrile as the coating polymer. The coated template is heated to 800° C. in a tube furnace, and the polymer undergoes carbonization. The material obtained is washed with acid (2M HCl), removing template and support, leaving behind a porous structure—lung type carbon. Using this system, it is possible to investigate and isolate the combined and separate roles of directionality and connectivity in the flow through the electrode.

Characterization

Electron microscopes is employed to characterize the morphology of templates and carbons. Scanning ELECTRON MICROSCOPY (SEM) and transmitting electron microscopy (TEM) enable identification of features such as template directionality & branching, porosity of the carbons, and uniformity. By using crushed carbons, both cross sections and view from above are obtainable with SEM. TEM images a 2D projection of the 3D structure, revealing the dimensions of the pores. Graphitic regions can also be identified with TEM. Energy dispersive spectroscopy (EDS) can be used to determine that indeed the support and template were indeed washed out, and that observed differences in catalytic activity are not due to support or template doping.

Surface area and pore size distribution are determined by physisorption of $N_2$ as analyzed models such as Brunauer-Emmett-Teller (BET), density functional theory (DFT) and Brunauer-Joyner-Halenda (BJH). Porosimetry yields information regarding specific surface area, pore size distribution, micro and meso pore volume, as well as total pore volume. For high accuracy of carbon micro pore analysis, $CO_2$ adsorption may be used—it gives more accurate results than Nitrogen. Using physisoprtion and electrochemistry (detailed below), the inventors attempt to show that carbons with similar pore distribution but different pore arrangement have different electrochemical activity.

Electrochemical Studies

The comparison of electrochemical activity in different carbons can be done in a lab scale by using cyclic voltammetry (CV). By observing the peak current of the voltammogram, insight on flow may be obtained: as this point is where the faradaic rate of reaction and the rate of diffusion are equal, higher peak current means better diffusion and access to the catalyst. Normalizing the current to the carbon's electrochemical surface area (as calculated from the double layer capacitance) takes into account surface area differences for the different carbons. A carbon with low surface area but easy flow may give access to the same number of sites as a tortoise carbon with high surface area, and the current measured will be the same; but current density will not.

To measure the activity of materials with surface area that may diverge, it is useful to compare current density rather than current. To do this, the surface area must be calculated from measurements, and there are several approaches. One is to use the geometric surface area. However, this approach neglects the difference in microscopic morphology of the carbons, which is the parameter the inventors want to control for. Another option is to use the surface area obtained from the physisorption, but that area does not necessarily correspond with the reactant's access to the electrode (although it is a closer approximation than geometric surface area). The approach the inventors use is calculating the surface area using the double layer capacitance difference, or the electrochemical surface area (ECSA). The advantage of this method is that it gives an indication on the surface area of the actual electrode used for the experiment, and corresponds to the reactants access to the surface area. However, the value obtained is an approximation, as the specific capacitance of materials such as hierarchical porous carbons cannot be reliably calibrated.

In addition to CV, chronoamperometry can enable insight into the different flow regimes in the carbon. In a potential step chronoamperometry (PSCA) experiment, the potential is stepped from no-current to high-current of oxygen reduction (in solution), and the current decay is measured (i-t). This determines the rate of pore filling, and reveals diffusion regimes on multiple time-scale. These regimes may include nearly instantaneous reduction of pre-adsorbed $O_2$, followed by reduction of $O_2$ arriving from nearby or distant pores. At longer timescales, it shows $O_2$ arriving at the edge of the diffusion layer of the electrode.

A mechanistic study of the reaction (two electron versus four electron reactions) can be done employing rotating disk electrode (RDE) or rotating ring disk electrode (RRDE).

The determination of diffusion coefficients for oxygen in such systems may be difficult as most methods rely on knowing the number of electrons consumed in the reaction, a number which is somewhat non trivial with ORR. The use of a one electron probe such as ruthenium hexamine trichloride enables the inventors to overcome these difficulties.

The disadvantage of using CV is that it only gives an approximation of the behavior in other systems, and tests with actual fuel-cell setups are necessary to fully demonstrate the concept.

Photonic Methods

Finally, several methods are utilized to complete the understanding of the materials as catalysts: X-ray diffraction will be used to identify crystal phases in the materials—such as graphitic regions, or to confirm that the acid wash was indeed effective in removing all ZnO. Raman will be utilized to identify the relative amount of graphitic and amorphous carbon. This is important for completeness of the data on the catalyst, as graphitic regions correlate with conductivity while amorphous regions with active sites.

XPS can be used to identify the amount of nitrogen in the material, as well as differentiating between different nitrogen sites: graphitic, pyridinic, pyrrolic and more. This is unrelated to the porous system, but completes the data on the catalyst (and is necessary for publications in the field).

FIB-SEM Tomography Imaging and Modeling

It is possible to model the flow in a structure on a sub-micron scale using FIB-SEM tomography. In this method, a resin-embedded specimen cross-section is imaged. Then, surface layers are etched away by focused ion beam (FIB) milling. The process is repeated for many layers, resulting in a stack of SEM micrographs. Computational image analysis is used to identify different phases by their contrast, correct for drift and the presence of bubbles and other known defects. The investigated volume is reconstructed in three dimensions, yielding a tomogram. Sample volumes as large as 100 s of $\mu m^3$ are reconstructed in a single experiment, at resolutions down to several nanometers. The tomogram is analyzed computationally to yield a 3D model of the internal pore structure of the carbon. This structure is then divided into a 3D finite mesh, which is used for modelling mass-transport through the volume. This combined approach yields quantitative structure-flow correlations.

Example 1

Designing a Channel Network

As the ZnO template controls the meso and macro porous structure, the ability to fine-tune the synthetized rods and branched rods is necessary, as well as the fraction of carbon which is templated.

The dimensions may be controlled using the hydrothermal parameters: precursor concentration, temperature and reaction time. Branching of the rods is controlled by the above parameters as well as concentration of chelating agent—ethylenediamine (EDA). The fraction of templated carbon is controllable with the thickness of polymer coating, and possibly pyrolysis temperature.

To gain insight and find conditions which reliably produce the desired structures, experiments are conducted by changing one parameter and keeping the rest fixed. Once a reasonable value is found, it is kept constant and another parameter is changed. Each parameter takes between one day to one week to tune, and so multiple iterations may be conducted efficiently. For instance, to find an ideal concentration, the time and temperature are constant, and six or more reactions are executed in parallel. To find the best temperature, the experiments must be conducted in series, which elongates the time for tuning.

A pre-requirement is identifying the bracket in which it is desirable to work. For example, it was found that the EDA concentration must be within a bracket of between 7 and 9 mili-molar—which means tuning the quantity added to the reaction by single microliters.

So far it has been determined that longer reaction times leads to larger rods, though the size plateaus after 8 hours. Concentration of zinc nitrate, hexamethylenetetramine, and temperature variations change the aspect ratio. The ratio between EDA concentration and zinc nitrate concentration needs to be larger than 1.4 and less than 2. The amount of copper support also needs to be controlled in the branching stage, as the copper interacts with EDA.

Studying the Link Between Structure, Flow, and Reactivity

To formulate the relations between flow, and the channel dimensions, interconnectivity, and directionality, a range of carbon structures (based on FIG. 2) are prepared. Controlling for dimensions and varying the interconnectivity and directionality enables comparisons, which shed light on the overall effect of lung-type morphology on flow.

All these controls can be prepared using the zinc oxide templates and polyacrylonitrile system, which is described in Example 2.

Figure 2:
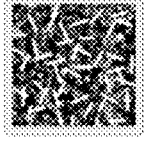
FIG. 2 presents a scheme of carbons that display various features of lung-type carbon that enable isolation and control the measured effect.
Figure 2:
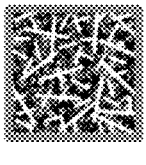
Figure 2:
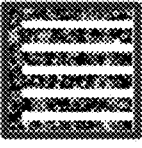
Figure 2:
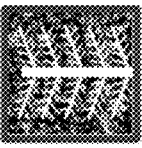
Figure 2:
Figure 2:

The role of directionality can be revealed by comparing carbon #5 of FIG. 2 to carbon #3 of FIG. 2. Carbon #5 of FIG. 2 has directional pores and carbon #3 of FIG. 2 has randomly aligned pores, and otherwise they are the same. The control for interconnected hierarchy utilizes the same principle, comparing carbon #3 of FIG. 2 with carbon #4 of FIG. 2. The pore distribution in both should be identical, i.e. same volume of macro pores, meso pores and micro pores, with the only difference being that carbon #4 of FIG. 2 has interconnected pores.

Finally, the integration of both aspects is achieved in carbon #6 of FIG. 2, lung type carbon, which the inventors expect demonstrates the best flow characteristics and thus higher limiting currents than all other carbons tested.

In order for the control samples to as closely resemble carbon #6 of FIG. 2 (lung-type) except at the controlled parameter, the inventors approach is to reverse-synthesize all of the controls from carbon #6 of FIG. 2. This means, for example, that to obtain non-directional but hierarchical interconnected carbon (#4 of FIG. 2), the inventors take a ZnO 'micro forest' supported on copper mesh, and remove the mesh using electrochemical oxidation via a carrying agent—possibly iodine. The Idea is to oxidize and remove the copper into solution, without harming the ZnO, and collecting the branched ZnO structures which will be unsupported and unharmed.

Carbon #3's template is obtained by breaking up these branched structures into rods by high-power sonication. The template for carbon #5 is relatively more straightforward, as it's obtainable by skipping the chelating agent step. Template #2 is made from the #5 template in the same way described above for #4.

Figure 3:
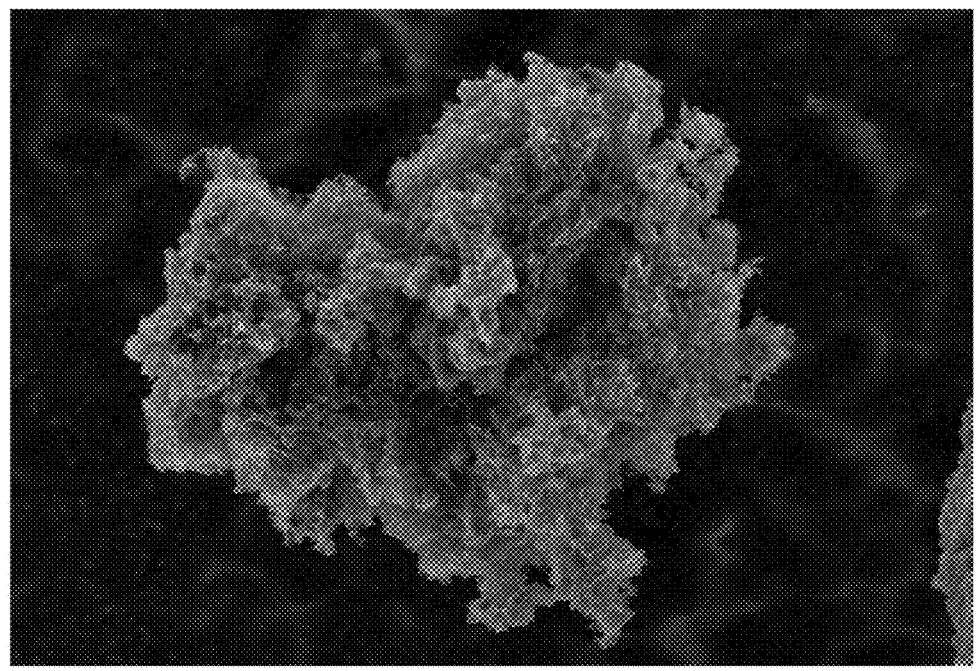
FIG. 3 presents a picture of a templated carbon; a large percent is untemplated.

In the current system, a fraction of the carbon is not affected by the template (FIG. 3).

Example 2

Experimental Results

Template

Figure 4:
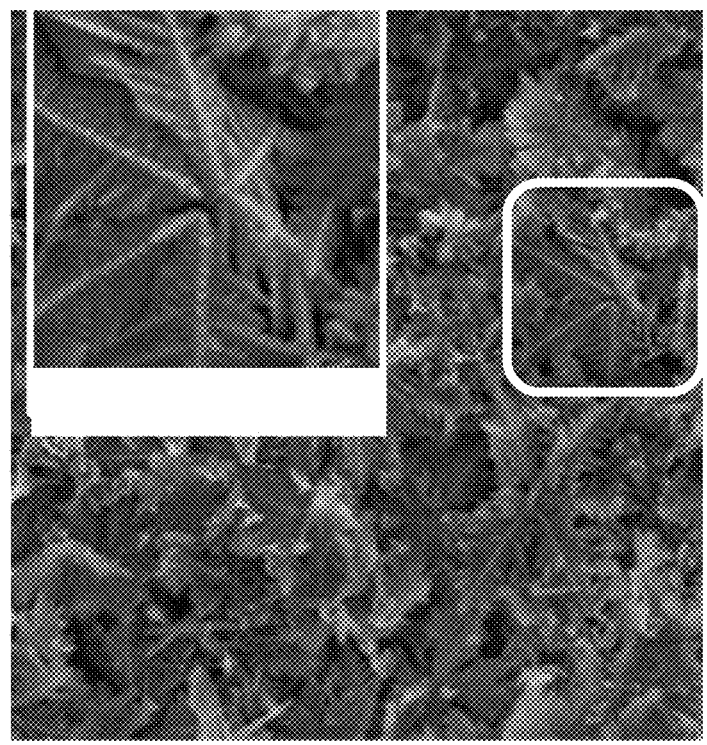
FIG. 4 presents a picture of Hematite "snow flake" with a crack in its center.

The first attempted for a template was to try and grow hematite ($\alpha$-$Fe_2O_3$) dendrites from a substrate. Fractal like crystals, which resemble a scattering of leaves on a microscale were described in various publications. If they could be prepared directionally from a support, they would be a suitable. Hematite dendrites were successfully synthetized in solution, as can be seen in FIG. 4, and the inventors began working on orienting them. However, it was discovered that the growth mechanism was not direct nucleation and growth as dendrites, but rather into a "snow flake" structure. A centrifuging step commonly used to separate out the solid precipitate causes the structure to break in its center—as can be seen in FIG. 4. This structure seems much more difficult to align or grow directionally from a surface, and so the inventors turned to investigate other systems.

Figure 5:
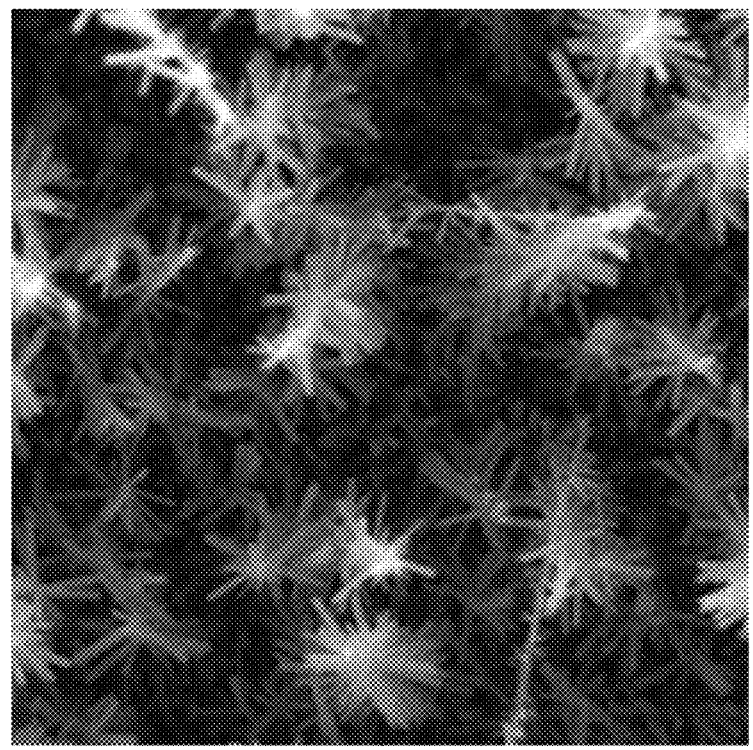
FIG. 5 presents a picture of CuO strands with ZnO rods branching out.

Looking for more 'tree-like' systems, a CuO—ZnO composite structure was found. Copper foil which is heated to 400° C. develops CuO nano wires. Placing the oxidized copper foil in a solution with zinc nitrate and hexamethylenetetramine, and applying heat, causes growth of ZnO hexagonal rods, leading to material like the one seen in FIG. 5. This was considered an appropriate directional and hierarchical template, and so the inventors continued with the planned scheme.

The template was coated with a polymer, and pyrolysed. During pyrolysis, the polymer turned into carbon, and that in turn reacted with the copper oxide, reducing it to metallic copper and oxidizing the carbon. The carbon is oxidized at the sites where it is most important to have a high level of control on the structure. This behavior was undesirable, and so it was decided to make the entire structure based on ZnO.

Zinc Oxide Templates

The possibility of producing branches on ZnO rods has several advantages: ZnO rods grow in a directional form readily, from many substrates. Their size is appropriate, and they easily dissolve in HCl for template removal. Most importantly, ZnO trees are tunable in size in every dimension, offering a vast field of possibilities for mass transfer investigations.

The preparation of the ZnO is via a hydrothermal route. Zinc nitrate and hexamethylenetetramine are mixed in an aqueous solution, and heated for several hours. If there exists an appropriate support in the solution, heterogeneous growth of the ZnO crystals occurs, leading to directionally supported ZnO rods. If there is no support, homogenous precipitation as rods occurs, with their size dependent on nutrient concentration, temperature and reaction duration.

Figure 6:
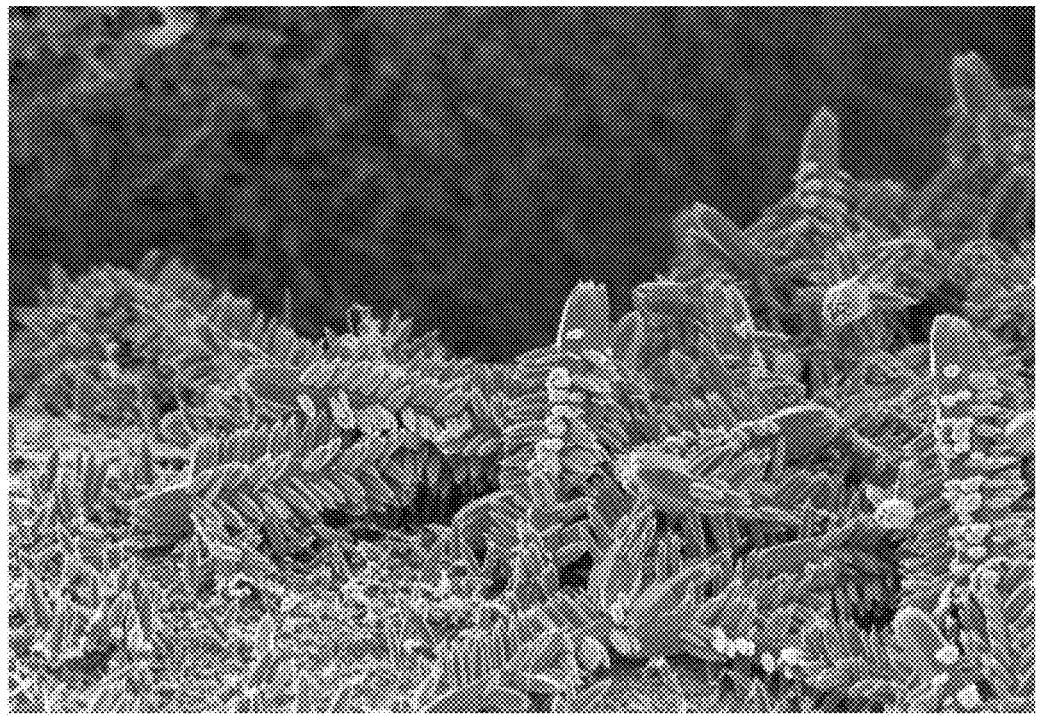
FIG. 6 presents a picture of branched ZnO structure.

By adding chelating agents such as ethylenediamine or propylenediamine in a second hydrothermal reaction, the morphology of the crystal changes, and hierarchical structures may be obtained, as can be observed in FIG. 6.

From Polymer to Carbon

The polymer used must fulfill several characteristics:
 a. A carbon based polymer containing nitrogen atoms, which incorporate into the carbonaceous matrix.
 b. A polymer which will retain its shape when being pyrolyzed.
 c. A system where ZnO can be added where viscosity is low, and wetting of the ZnO surface high. Capillary effects on the rough surface of a supported ZnO microforest could negatively affect templating, as the polymer will be supported above the ZnO structure instead of coating it.

The first system investigated was melamine formaldehyde resin (MFR). Each melamine molecule contains six nitrogen atoms, and a functionality of between 3 to 6, meaning a highly cross-linked system. It polymerizes in a step elimination mechanism (which produces a water molecule), and the initial stages of the polymerization have low enough viscosity to enable coating.

However, when this material is pyrolyzed, a foamy and bubbly carbon is obtained—likely due to the water trapped inside the polymer which gets boiled out (the water forms during the elimination reaction in the polymerization). The foamy nature of this carbon prevents its use as an efficient template, as the carbon around the carefully tuned ZnO structure does not incorporate the template's shape reliably.

Even though the foaming caused us to reconsider use of MFR, it was demonstrated that the templating concept is viable, as can be seen in the MFR derived carbon in FIGS. 7A-B.

The next system considered was polyacrylonitrile (PAN). PAN is a known precursor for nitrogen doped carbons, and it was even used with ZnO templating—although with no focus on pore morphology. By itself, acrylonitrile has a functionality of 2—meaning the system will be linear, and the polymer likely thermoplastic. Therefore, divinylbenzene (DVB), with a functionality of 4 is added to the precursor mix as a hyper-crosslinker. The mix of precursors, acrylonitrile and DVB has low viscosity which easily wets ZnO, even when it is in the form of dense rods growing from a surface.

PAN polymerizes in a chain reaction, and some work went into finding a method for the polymerization to occur in a more controlled manner. A thermal initiator is added— benzoyl peroxide (BPO). To lower its half-life time to several minutes in room temperature an additive is used— N,N dimethylaniline.

The 4 component polymer precursor reacts violently when in bulk, such as in a vial or beaker. But when it's spread out as a film on a surface, the reaction occurs gradually. Supported ZnO is added 25 minutes after adding the initiator, and the polymerization continues, eventually capturing the template. Homogenously grown ZnO can be added directly to the precursor solution, but spreading it out into a film is still necessary for a uniform ZnO distribution and to avoid a violent chain polymerization.

The carbonization process takes into account a need for curing the polymer before heating above pyrolysis temperature, so the heat profile looks as following: an initial heat to 70 degrees removes oxygen and water. Next, heating to 300 degrees anneals the polymer. The subsequent rise to 800° C. is the pyrolysis, and after that is done the reaction is allowed to cool to room temperature. The entire procedure is performed in a tube furnace under an inert atmosphere (argon), and the profile is displayed in FIG. 8.

After pyrolysis, the carbon is washed in HCl 1M or 2M for two days, for removal of the ZnO and the copper support.

Figure 9C:
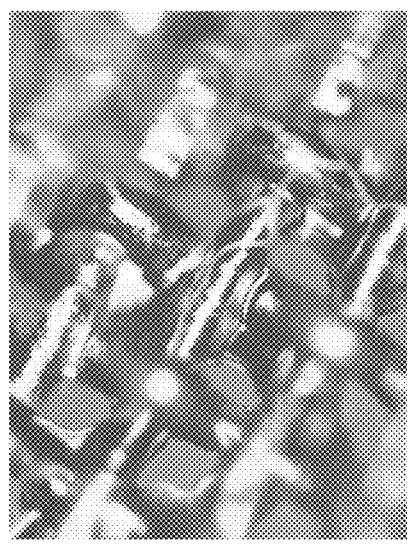
FIGS. 9A-C present pristine copper mesh (FIG. 9A), copper mesh coated with PAN (FIG. 9B), and PAN coated copper mesh after pyrolysis (FIG. 9C)
Figure 9B:
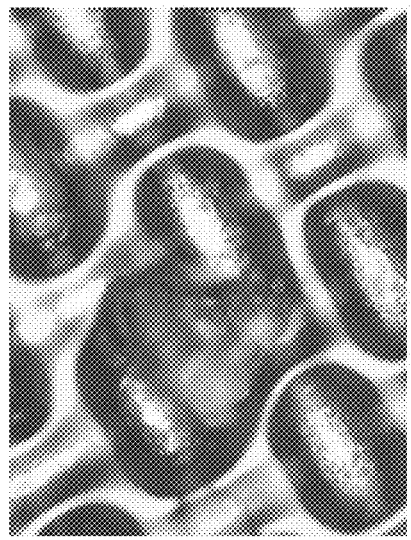
Figure 9A:
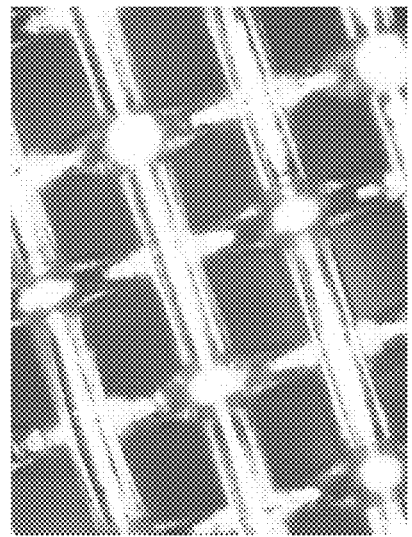

FIGS. 9A-C displays optical microscope imagery of a copper mesh undergoing this process—left to right, pristine, PAN-coated, and after pyrolysis (note the polymer that formed into adhering carbon).

The progress that has been done on the templates described in the work plan can be seen summarized in FIG. 10. In each row, the cartoon of the carbon is shown, together with an SEM image of the relevant template prepared, and a carbon derived from that template if it has been done.

Electro Catalytic Measurements

Once the carbon is obtained, electrocatelytic activity is measured using a three-electrode cell setup. The carbon is suspended in water, ethanol and low concentration of nafion, and deposited onto a glassy carbon (GC) electrode. Once the electrode is dry, a thin film of the active carbon is formed on the GC, with a thin layer of nafion enabling ionic conductivity. The electrolyte is an alkali solution at pH 13, as N-doped carbon show oxygen reduction activity mainly in basic conditions. Oxygen gas is bubbled into the electrolyte until saturation, and then a blanket of flowing oxygen is maintained. Temperature is sustained by immersing the cell in a thermostatic bath at 25° C.

To compare the differences between different pore models, it is necessary to find a method that will differentiate the rate at which reactants can be reduced on the electrode, as they diffuse towards it from solution. Conveniently, a fundamental characteristic of cyclic voltammetry correlates to that phenomenon: the peak current. In cyclic voltammetry, as the potential becomes more negative, the electrode is more polarized and the reduction reaction rate increases. However, at some potential, the rate at which the reactants react and the rate at which the diffuse to the electrode are equal. From this point, going to more negative potentials will result in decrees of the current, as the reaction is limited by the rate of reactant diffusion. The point where rate of reaction and rate of diffusion are equal is the peak of the voltammogram, and the current at that point is indicative on how efficient flow is in the material.

Figure 11:
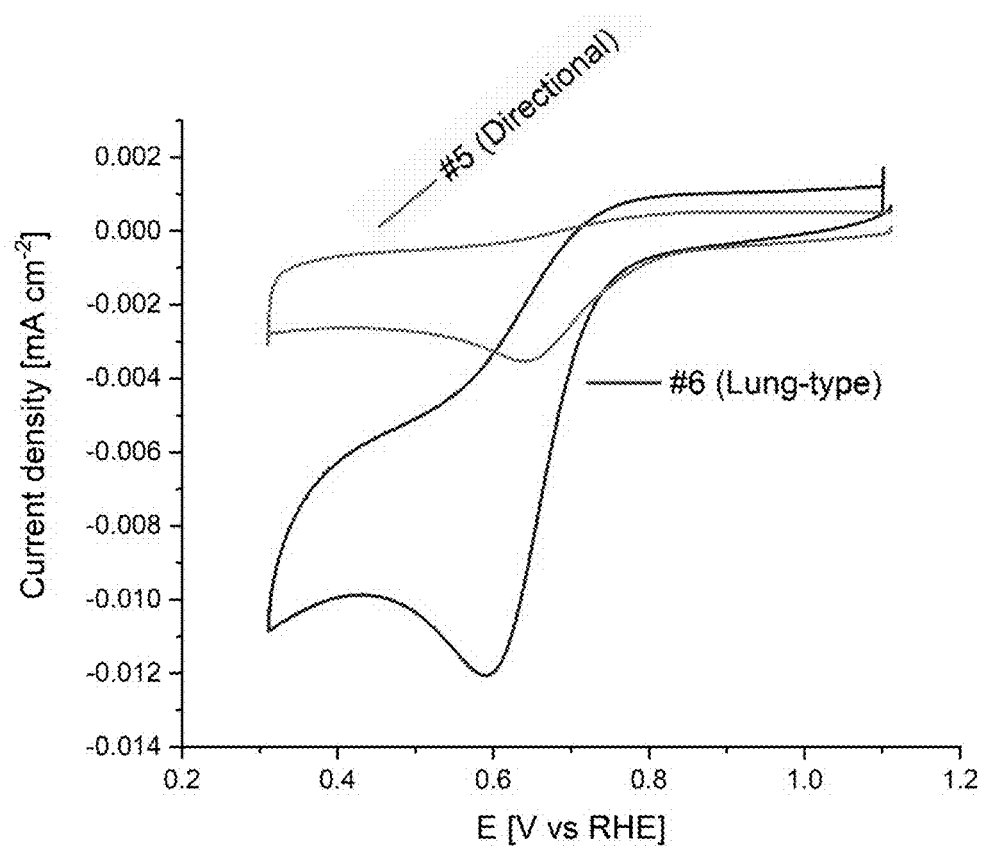
FIG. 11 presents cyclic voltammetry (CV) of various PAN carbons, demonstrating the concept of superior flow in lung-type carbon.

FIG. 11 displays a comparison between PAN derived carbon with directional pores (row 5 in FIG. 10) and lung type carbon (row 6 in FIG. 10). The onset potential and peak position are very close, which is reasonable as the carbon composition should be identical; but as the lung-type carbon's pores allow more accessibility to active sites, the peak current density is significantly higher.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A composition comprising a porous carbon material; said porous carbon material is in a form of a carbon matrix doped with nitrogen atoms and a plurality of pores; wherein:
the plurality of pores consists of a first channel with a width in the range of 50 nm to 1000 nm and second channels with a width in the range of 20 nm to 200 nm;
said first channel is in a form of a tree trunk and said second channels are in a form of tree branches in fluid communication with said tree trunk; and
wherein said first channel has a unidirectional orientation within said porous carbon material.

2. The composition of claim 1, wherein a length of the second channels is between 20 nm to 1 um.

3. The composition of claim 1, wherein the ratio of said second channel to said branches is in the range of 1:10 to 1:200.

4. The composition of claim 1, wherein a length of said first channel is between 1 um to 20 um.

5. The composition of claim 1, comprising 1 to 50 first channel per $\mu m^2$ of said carbon material and further comprising micropores with a diameter in the range of 0.5 nm to 5 nm.

6. The composition of claim 1, comprising a branch density of 100 to 1000 branches per $\mu m^3$ of said carbon material.

7. The composition of claim 1, wherein said carbon material has a thickness in the range of 0.1 µm to 50 µm, and wherein the plurality of pores are characterized by a hierarchical porosity.

8. The composition of claim 1, wherein said carbon material comprises a surface area of 300 $m^2/g$ to 2000 $m^2/g$, and the width of said first channel is at least 2 times greater than the width of the plurality of second channels.

9. The composition of claim 1, wherein said nitrogen atoms are present in pyridinic form, pyrrolic form, pyrimidonic form, graphitic form metal-bound form, oxidized form, or any combination thereof.

10. The composition of claim 1, wherein said first channel and said second channel comprise a metal, metal oxide, or combinations thereof.

11. The composition of claim 1, further comprising a substrate.

12. The composition of claim 1, wherein said composition is a catalyst.

13. An article comprising the composition of claim 1.

14. The article of claim 13, wherein said composition is deposited on at least one surface of said article.

15. A composition comprising a porous carbon material; said porous carbon material is in a form of a carbon matrix doped with nitrogen atoms and a plurality of pores; wherein:
the plurality of pores consists of a first channel with a width in the range of 50 nm to 1000 nm and second channels with a width in the range of 20 nm to 200 nm; a width of said first channel is at least 2 times greater than the width of the second channels;
said carbon material is characterized by a surface area of 300 $m^2/g$ to 2000 $m^2/g$;
said first channel is in a form of a tree trunk and said second channels are in a form of tree branches in fluid communication with said tree trunk; and wherein said first channel has a unidirectional orientation within said porous carbon material.

\* \* \* \* \*